INVENTORS
GEORGE C. NOLL &
FLOYD Y. MILLER
BY
Oberlin, Maky & Donnelly
ATTORNEYS Nov. 16, 1965 G. C. NOLL ETAL 3,217,895
SAFE LOAD INDICATOR FOR CRANES AND THE LIKE
Filed Dec. 20, 1962 4 Sheets-Sheet 2

INVENTORS
GEORGE C. NOLL &
FLOYD Y. MILLER
BY
Oberlin, Maky & Donnelly
ATTORNEYS

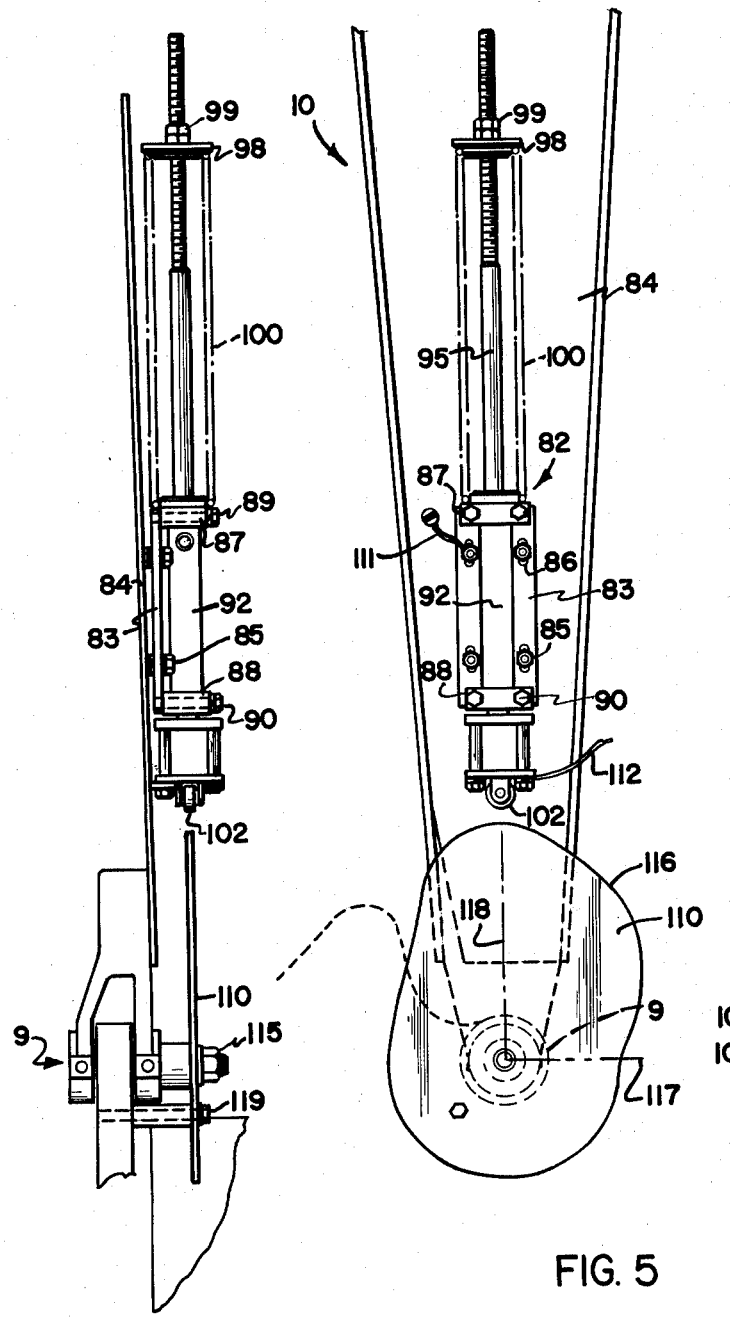
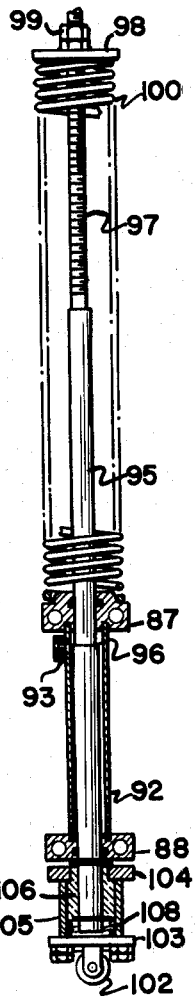
FIG. 4
FIG. 5
FIG. 6
INVENTORS
GEORGE C. NOLL &
FLOYD Y. MILLER Nov. 16, 1965 G. C. NOLL ETAL 3,217,895
SAFE LOAD INDICATOR FOR CRANES AND THE LIKE
Filed Dec. 20, 1962 4 Sheets-Sheet 4
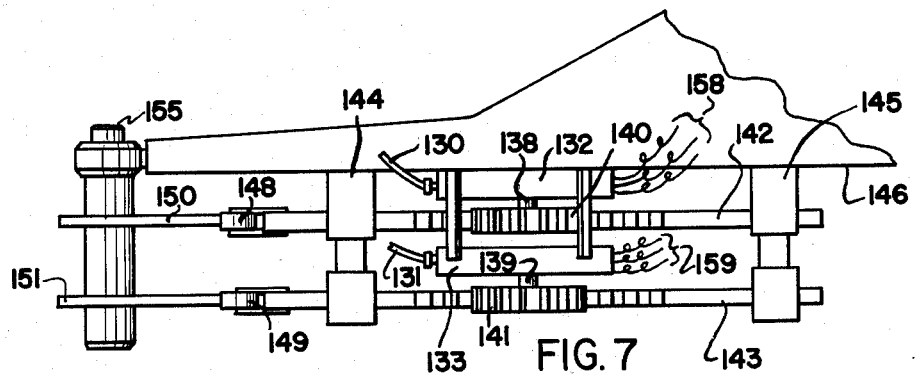
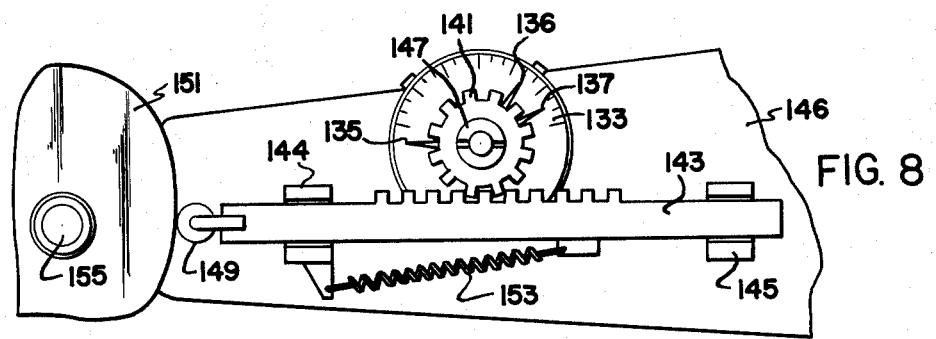
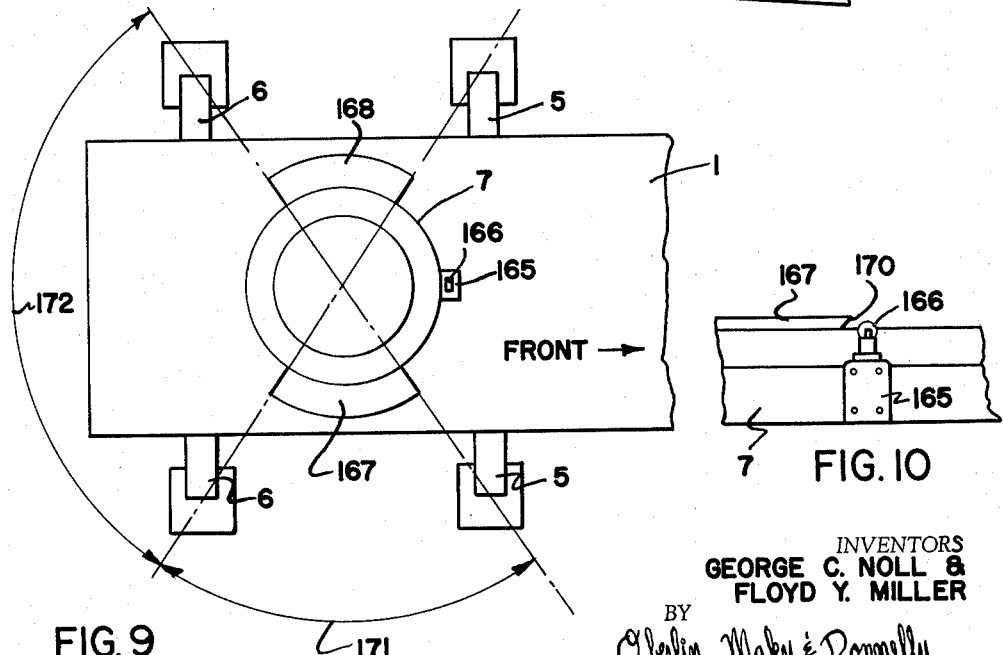
INVENTORS
GEORGE C. NOLL &
FLOYD Y. MILLER
BY
Oberlin, Maky & Donnelly
ATTORNEYS

United States Patent Office 3,217,895
Patented Nov. 16, 1965

3,217,895
SAFE LOAD INDICATOR FOR CRANES AND THE LIKE
George C. Noll and Floyd Y. Miller, Elyria, Ohio, assignors, by mesne assignments, to Koehring Company, Milwaukee, Wis., a corporation of Wisconsin
Filed Dec. 20, 1962, Ser. No. 246,230
11 Claims. (Cl. 212—39)

This invention relates generally, as indicated, to a safe load indicator for cranes and the like and more particularly to a simplified load-radius responsive crane operator warning mechanism.

Heretofore, safe load indicators for cranes and the like have been provided which compensate for the radius at which the crane is working. This has, however, been obtained rather indirectly by employment of complex linkages operative to rotate a cam so as to correspond to the angle of the derricking cable calibrated to determine the angle at which the boom is working. This may be accomplished, for example, by securing a link to a fixed anchorage on the crane and to a crank arm connected to the cam. The force obtained from the actual crane load is then generally applied through a force reduction system and acts against resistance to close an alarm circuit when the load exceeds a predetermined amount. The rotation of the cam then adjusts a movable fulcrum in the indicator to compensate for the actual radius of operation of the crane. Reference may be had to U.S. Patent No. 2,988,040 for a disclosure of such a link operated cam mechanism.

Cam mechanisms for such devices have extremely critical curvatures and generally are machined at the site of operation. Moreover, the units in which these mechanisms are employed may weigh, for example, as much as 500 pounds requiring further compensation.

It is accordingly a principal object of the present invention to provide a light, simplified safe load indicator for cranes and the like.

A further important object is the provision of a closed circuit hydraulically operated indicator for cranes and the like of a simplified fail-safe construction.

Another object is the provision of such safe load indicator which can quickly and easily be installed in a variety of cranes.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 4 is a fragmentary top plan view of a portion of the foot of the boom structure illustrating one form of the invention and the radius compensating cam;

FIG. 5 is a side elevation of the embodiment of FIG. 4 as seen from the right thereof;

FIG. 6 is a longitudinal section of the movable load responsive member shown in FIGS. 4 and 5;

FIG. 7 is a view similar to FIG. 4 showing a further form of the present invention;

FIG. 8 is a side elevation of the embodiment shown in FIG. 7;

FIG. 9 is a schematic diagram of the crane base and turntable showing the switch and its operator actuated in response to swinging of the turntable automatically to select an over-the-sides or over-the-ends system; and FIG. 10 is an enlarged fragmentary side elevation of such switch.

Figure 1:
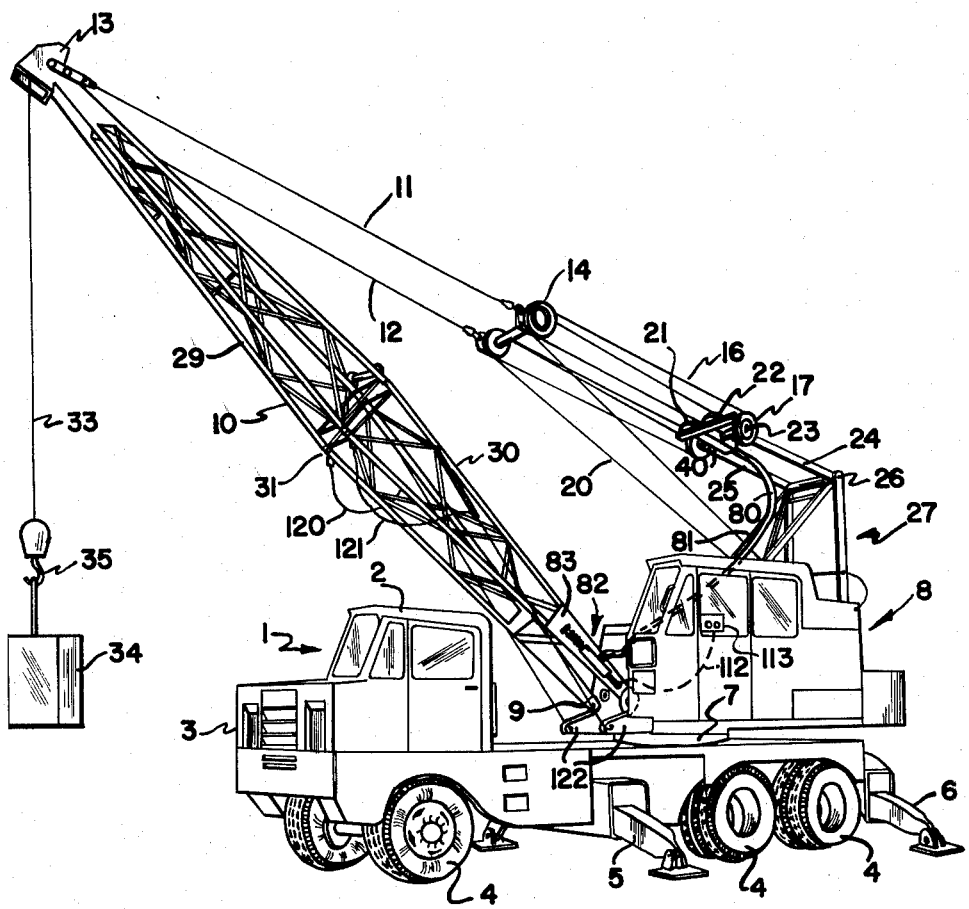
FIG. 1 is a perspective view of a crane employing a safe load indicator in accordance with the present invention.

Referring now to the drawings and more particularly to FIG. 1, there is illustrated a crane in accordance with the present invention which may be mounted on a rubber-tired carrier shown generally at 1. From a driver's cab 2, the operator may propel the crane over the ground by employing a prime mover generally indicated at 3 to drive the wheels shown at 4. Pairs of hydraulically operated quickly positioned outriggers 5 and 6 may be employed to provide a firm base for the operation of the crane, the superstructure of which is mounted on a turntable 7 on the bed of the carrier 1. Such crane superstructure shown generally at 8 is provided with a boom foot shown by the pivots 9 to which the boom 10 is pivotally mounted for movement with respect to the crane superstructure. The boom is supported by pendants 11 and 12 secured between the peak 13 of the boom and the floating harness 14. A reeving system shown generally at 16 interconnects the harness 14 and a further harness 17. The cable 20 of the reeving system may have one end secured to the superstructure and the other end leading to the boom hoisting drum. The harness 17 includes two horizontally disposed sheaves 21 and 22 and two sheaves on the end of axle 23 with such axle extending between frame links 24 and 25 which are connected to the axle 26 at the peak of a retractible backhitch gantry shown generally at 27.

The length of the boom 10 may be increased simply by adding boom sections between the peak section of the boom 29 and the base boom section 30 which are pin-connected together at 31. An engine in the superstructure 8 drives a hoisting drum to which the hoisting cable 33 is connected, such being trained over a sheave at the peak 13 of the boom 10 and a load 34 or the like may be connected to the hoisting line as by the hook shown at 35.

If the operator attempts to lift an excessively heavy load, he may either impair the stability of the machine causing it to tip, or the strength of various machine components may be exceeded, both, of course, resulting in damage to the machine and possible injury to the operator or workman about the machine.

To safeguard against such damage and injury, it is essential to devise a mechanism to measure the load being lifted by the hoist line and this can be done by measuring the pull on the derricking cable 20 and then translating this pull into terms of the load being lifted. When the load reaches the danger point, the mechanism will then trigger a signal to the operator warning him of the impending overload.

In order to measure the pull on the derricking cable 20, there is provided a hydraulic or fluid sensing piston-cylinder means in the form of a master cylinder unit shown generally at 40 in FIG. 1 mounted in the gantry harness 17 and connected operatively to the sheave 21 to measure the pull of the cable 20 trained thereabout. Such unit includes a cylinder 41 which is mounted on a circular projection 42 of a block 43 which encloses the harness axle 23. The other end of the cylinder 41 is provided with a reducing ring 44 held thereto by suitable fasteners or the like shown as the screws 45 providing an opening for the piston rod 46 which is in the form of a tubular member welded to the piston 47 fitted within the cylinder 41. The opposite end of the rod is welded as indicated at 49 to a block 50 which is secured to top and bottom plates 51 and 52. These plates may be secured to the block by the elongated stud and nut assemblies shown at 53.

The plates 51 and 52 then extend toward the sheave 21 and are provided with respective rounded outer end portions 55 and 56 which accommodate sheave pin 57. A pin 58 extending through a bracket 59 on the plate 51 and the pin 57 may be employed to preclude turning of the pin with respect to such plates.

The sheave 21 is normally held by a transverse frame member comprised of top and bottom plates 61 and 62 which are welded to straps 63 and 64 respectively which are fastened to the block 43 by the screws shown at 65 and 66, respectively. For the sheave 21, the frame plates 61 through 64 are provided with elongated slots 68 and 69 accommodating the pin 57 and thus the sheave 21 for movement longitudinally of the slots 68 and 69. The plates 51 and 52 are also provided with relatively more narrow slots 70 and 71 in which slidably fit removable elongated keys 72 and 73 held to the block 43 by the screws shown at 74 and 75 respectively.

It can now be seen that the rod 46, and thus the piston 47, is mounted for movement with the pin 57 of the sheave 21 and that such sheave is mounted for movement with respect to the harness framing. An O-ring or the like 77 may be employed in the piston 47 and the blind end of the cylinder may be provided with a fluid outlet shown at 78 provided with a projecting male union 79.

The fluid within the cylinder will preferably be hydraulic fluid and the flexible hydraulic line 80 is coupled to the union 79 and leads along the frame member 25 and down along the strut 81 of the back-hitch gantry 27 to either of the embodiments of the invention shown in FIGS. 4 and 7, for example. As seen in FIGS. 1 and 4–6, the line 80 may lead to a boom cylinder mechanism or gauge means 82 which comprises a mounting plate 83 secured to the boom side plate 84 by suitable fasteners shown at 85 through elongated slots 86 in the mounting plate 83 permitting longitudinal adjustment thereof. Cylinder heads 87 and 88 are secured to the mounting plate as by the bolts shown at 89 and 90 respectively. Between the cylinder heads 87 and 88 there extends a tubular cylinder 92 provided with a tapped union 93 to which the end of the hydraulic tubing 80 is connected.

An elongated rod 95 extends through the cylinder heads 87 and 88 and, of course, through the cylinder 92, such rod being slidably sealed in the cylinder heads by the O-rings shown. It is noted that the rod is provided with a shoulder at 96 within the cylinder 92 and accordingly hydraulic fluid under pressure forced into the cylinder through the coupling 93 will act upon the shoulder 96 forcing the rod downwardly as viewed in FIGS. 4 through 6. The upper end of the rod 95 is reduced in diameter and threaded as shown at 97 and an adjustable shouldered stop plate 98 is threaded on the end thereof and held by a nut 99 and such plate provides a seat for spring 100 extending between the plate 98 and the shouldered spring receptacle on the cylinder head 87. The spring 100 thus acts to move the rod upwardly or away from the boom foot and any hydraulic fluid pressure within the cylinder 92 acting on the shoulder 96 of the rod 95 will have to overcome the pressure of the spring 100 to move the rod longitudinally downwardly.

The end of the rod 95 is provided with a roller contact 102 mounted on a plate 103 which is secured by suitable screw fasteners to a further plate 104, such plates being separated by a cylindrical head 105. A cylindrical insulator 106 surrounds the rod 95 within the head 105 insulating the roller from electrical contact with the rod 95. A spring 108 extends between the insulator 106 and the plate 103 keeping the rod 95 out of contact with the plate 103 and it can be seen that as fluid is admitted to the cylinder 92, it will force the rod 95 downwardly causing the roller 102 to engage the cam 110 fixedly mounted on the revolving superstructure of the crane compressing the spring 108 causing electrical contact between the plate 103 and the rod 95. The mounting plate 84 may be connected to ground as indicated by the wire 111 and the plate 103 may be connected electrically as shown at 112 to an operator warning box shown at 113 in FIG. 1. In this manner, as the hydraulic fluid in the cylinder 92 forces the roller 102 against the cam 110, a positive ground is obtained and an electrical signal will provide the operator with a visual and/or audible warning that the load is approaching the maximum safe load permissible.

The cam 110 which is mounted on the superstructure by means of the fastener 115 is positioned exactly at the foot of the boom and the cam surface 116 presented by the periphery of the cam for the operating quadrant shown between the horizontal and vertical lines 117 and 118, respectively, indicates the safe load at the radius indicated by the boom angle, hence the moment acting on the boom at a particular angular disposition. The cam may be held by a separate fastener 119 to preclude the cam from rotating with the boom and it will be seen that the cam is fixed with respect to the crane superstructure. In FIG. 5, the boom is shown in a directly vertical position and it will be understood that this position is shown only for illustrative purposes since during the operation of the crane, the boom will never reach such a position due to the Kelly stop cables shown at 120 and 121 in FIG. 1 which are anchored to the projections 122 on the superstructure and which act as boom stops to preclude the boom from pivoting over the back of the machine. When the boom is in a substantially vertical position, there will be little pull required on the derricking cable 20 to maintain the boom and the load in such vertical position. Accordingly, very little distance is provided between the lower contact roller 102 and the periphery of the cam. As the boom moves into a more horizontal position, the cam surface 116 only gradually recedes in that in the approximate position of the boom in FIG. 1, the moment arm or the distance from the back-hitch gantry pin 26 to the boom will be at an approximate maximum. Accordingly, when the boom is theoretically horizontal, the most pull upon the derricking cable 20 will be required and accordingly the distance between the surface 116 and the contact roller will be the greatest.

In certain types of machines, it may be desirable to provide the operator with an advance warning as the machine approaches (usually within 10%) its rated lifting capacity. To accomplish this, the slight lost motion between the rod 95 and the plate 103 provided by the spring 108 may then be employed to provide a signal the moment the roller 102 touches the cam 110 and is grounded therethrough and a further signal may be provided when the rod 95 touches the back of the plate 103. Any number of opening and closing potential-ground circuits may be provided to actuate any audible or visual warnings to the operator desired.

It can now be seen that the pull upon the derricking cable 20 is measured by the hydraulic system and the greater the pull, the greater the displacement created in the hydraulic system. The area of the piston 47 may be approximately ten times the area of the shoulder 96 and accordingly a 10:1 ratio of movement is obtained. Thus for every millimeter of movement of the piston 47, the rod 95 will move ten millimeters. Accordingly, with the closed hydraulic system illustrated, the movement of the rod 95 is in direct relationship to the pull or tension on the cable 20.

The cam 110 then compensates directly for the radius of the boom and the proper safe load warning is obtained. Should the closed hydraulic system develop a leak, the piston 47 will move in toward cylinder bottom 42. Contacts A and B (FIG. 3) will touch causing the usual signal indicating to the operator that the system has failed and corrective measures can then immediately be taken. The signal would occur whenever the hydraulic fluid volume drops below the minimum required. The safe load indicator is also fail-safe in that should the hydraulic system develop a leak, the piston 47 will merely bottom in the cylinder 41, making the above low oil electrical contact, and the slots 68 and 69 will properly retain the sheave 21. It is here noted that the axle 23, which is connected to the sheave 21 through the master piston-cylinder unit, is rigidly connected to the superstructure through the back-hitch gantry. Accordingly, the master piston-cylinder unit may be mounted at any place on the superstructure such as the peak of the A-frame.

Figures 2, 3:
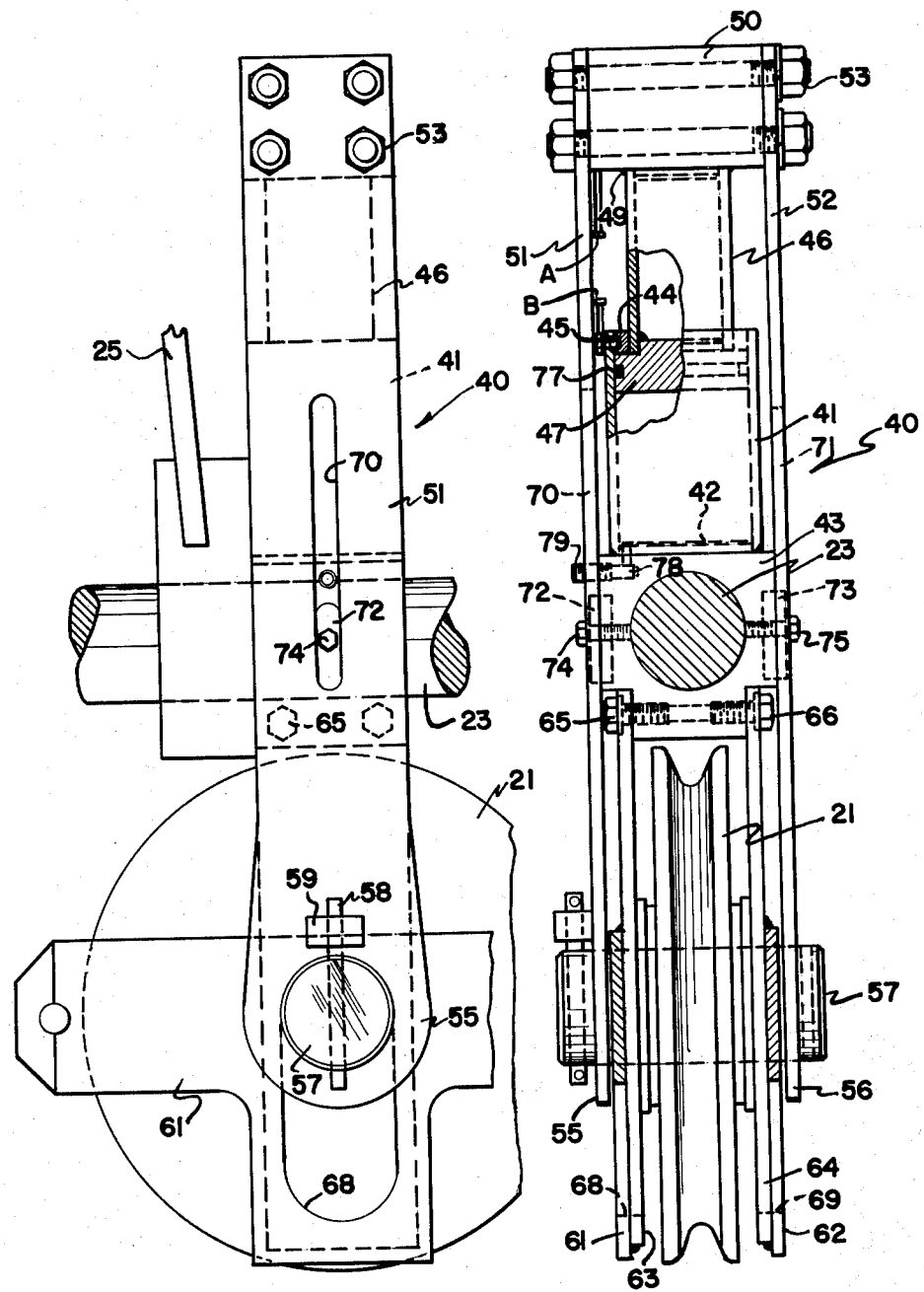
FIG. 2 is an enlarged fragmentary top plan view of a portion of the reeving for the boom derrick of such crane illustrating the load responsive hydraulic piston-cylinder assembly.
FIG. 3 is a fragmentary vertical elevation as seen from the right in FIG. 2 partially broken away and in section.

Referring now to the embodiment of the invention shown in FIGS. 7 through 10, the same master piston-cylinder unit shown in FIGS. 2 and 3 may be employed to conduct hydraulic fluid under pressure to the lines 130 and 131 to Bourdon tube pressure gauges 132 and 133 respectively. The hydraulic line 80 leading from the master piston-cylinder unit shown in FIGS. 2 and 3 may simply be branched and connected to the gauges as shown in FIG. 7. Each Bourdon tube pressure gauge as seen in FIG. 8 is provided with three contacts or indicators 135, 136, and 137. The contact 135 for each of the Bourdon tube gauges will move in a clockwise direction as seen in FIG. 8 in response to an increase in pressure in the lines 130 and 131 as the result of the load on the boom derricking cable. The contacts 136 and 137 may be set a fixed distance relative to each other and both may be manually adjusted to the desired setting. Such contacts are mounted for rotational movement on the shafts 138 and 139 of the gauges 132 and 133, respectively, and on the respective shafts there is provided pinions 140 and 141. These pinions are engaged with slide racks 142 and 143 which are mounted for sliding movement in brackets 144 and 145 secured to the boom side plate 146. Slip clutches 147 or the like may be provided between the the shafts 138 and 139 and the respective pinions to permit a manual adjustment of the position of the contacts 136 and 137. Each slide rack is provided with a roller as shown at 148 and 149 in engagement with cam plates 150 and 151, respectively, which may be identical in form. Springs 152 and 153, one for each slide rack, the attached to the respective slide racks and to the slide mounting bracket 144. These springs serve to maintain the respective rollers in engagement with the peripheral cam surfaces.

The boom in FIG. 8 is shown in horizontal position and it will be understood that as the boom elevates about the boom foot pivot 155, the cam 151 will force the roller 149 and thus the slide rack 143 radially outwardly away from the pivot 155 rotating the pinion 141 in a counter-clockwise direction as seen in FIG. 8. This will then move the contacts 136 and 137 in such counterclockwise direction to compensate the load warning mechanism for the load radius. The slide racks thus rotate the electrical contacts 136 and 137 of each Bourdon tube pressure gauge to provide automatic compensation for the angular position of the boom which is indicative of the load radius. As the pressure in the lines 130 and 131 increases, the contact 135 will move in a clockwise direction as viewed in FIG. 8, and when the contact 135 engages the contact 136, an electrical signal will be transmitted through the wiring 158 and 159 for each of the Bourdon tube pressure gauges, respectively, to provide the operator with a visible and/or audible alarm. When the first contact is made between the contacts 135 and 136, the operator will be provided with a warning signal. When the contact is provided between the contacts 135 and 137, the operator will know the maximum safe load has been reached. The slip clutches 147 on which the pinions 140 and 141 are mounted, provide for manual adjustment of the position of the contacts 136 and 137 so that the two systems shown in FIG. 7 may be initially manually calibrated for over-the-sides maximum loadings or over-the-ends maximum loadings. Since over-the-sides capacities are somewhat less, two systems are thus provided.

As seen in FIGS. 9 and 10, the switching from one system to the other may be accomplished by a two position microswitch 165 provided with a roller plunger 166. Such switch may be mounted for rotation with the superstructure directly beneath the boom and non-rotatable switch actuating plates 167 and 168 may be provided with beveled edges as indicated at 170 in FIG. 10. The switch actuators 168 and 167 will depress the roller plunger 166 when the boom is positioned over-the-sides or within the over-the-side segment 171 or the opposite segment of the complete swing circle. Similarly, when the boom and thus the switch 165 is within the over-the-rear segment 172, the roller plunger 166 will be in its up position and the same is true with the opposite segment or the over-the-front position of the carrier 1. When the roller plunger is depressed, it will actuate the switch 165 to energize one of the dual systems shown in FIG. 7 which has been preset for over-the-side loadings which, of course, will be somewhat less than over-the-end loadings. Similarly, when the roller plunger is not depressed, the over-the-ends system will be energized automatically and the other system cut-out.

The circumferential extent of the plates is governed by the base provided by the outriggers 5 and 6. If the outriggers were spaced farther apart, the arcuate length of the segments 167 and 168 would be increased. It is apparent that the segments could be mounted for rotation with the turntable and the switch mounted on the carrier frame as long as the switch 165 is in one position when the boom is over-the-sides and in the other position when it is over-the-ends.

It will, of course, be understood that the roller plunger mechanism shown in FIGS. 4, 5 and 6 may also be duplicated in the same manner as the mechanism shown in FIG. 7 and an over-the-sides and over-the-ends switching mechanism as shown in FIGS. 9 and 10 would be employed to switch the load responsive signals one from the other. The spring mechanism 100 would, of course, be adjusted to provide either an over-the-side or over-the-end reading. With the load indicator of the present invention, overloading of the machine cannot damage the overload unit with the possible exception of the Bourdon tube gauge shown in the FIG. 7 embodiment. In other words, there are no links or crank mechanisms which can be distorted by reason of excessive loads requiring replacement of the entire indicating unit. Both the Bourdon tube pressure gauges 132 and 133, as well as the microswitch 165, are conventional and readily commercially available.

It can now be seen that there is provided a light, simplified safe load indicator for cranes and the like employing a closed circuit hydraulic system to operate an indicator mounted on the crane boom adjacent the boom foot pivot cooperating with cams mounted at such pivot to compensate for the angular position of the boom or the radius of the load.

Other modes of applying the principle of the invention may be employed, change being made as regards the details described, provided the features stated in any of the following claims or the equivalent of such be employed.

We, therefore, particularly point out and distinctly claim as our invention:

1. A safe load indicator for a crane having a boom and derricking cable therefor comprising a sheave for the boom derricking cable, means mounting said sheave for limited movement, a hydraulic piston-cylinder means, a movable contact means, and a closed circuit hydraulic system operatively interconnecting said hydraulic piston-cylinder means and said movable contact means, said hydraulic piston-cylinder means being responsive to movement of said sheave to displace hydraulic fluid in said system, said movable contact means being operative in response to such fluid displacement to provide a signal for the operator upon a predetermined amount of movement thereof.

2. An indicator as set forth in claim 1 wherein the rod of said piston-cylinder means is connected to said sheave, the cylinder being fixed with respect to said sheave whereby the piston within said cylinder will thus displace the fluid therein moving said contact means.

3. An indicator as set forth in claim 2 wherein the ratio of movement of said piston-cylinder means to said contact means is on the order of 1 to 10.

4. A safe load indicator as set forth in claim 1 including means responsive to the angular position of the boom to vary the extent of such displacement required to provide such signal.

5. In a crane of the type having a revolving superstructure, a boom pivotally mounted on such superstructure for movement in a vertical plane, boom derricking means interconnecting the boom and superstructure for elevating the boom and load carried thereby, a safe load indicator comprising fluid sensing piston-cylinder means operatively connected to said derricking means, said piston-cylinder means being operative to develop fluid pressure in proportion to the load applied to said derricking means, gauge means mounted on said boom and connected to said sensing piston-cylinder means by a closed circuit fluid system operative to measure the pressure created by said sensing piston-cylinder means, and means responsive to the angular position of said boom to vary the extent of such measure required to produce an overload signal.

6. In a crane of the type having a revolving superstructure, a boom pivotally mounted on such superstructure for movement in a vertical plane, and a boom derricking cable interconnecting said boom and superstructure for elevating the boom and load carried thereby, a safe load indicator comprising fluid displaceable means interconnecting said boom derricking cable and said superstructure, a movable member mounted on said boom operative to move in response to said fluid displaceable means and thus the load on said boom derricking cable to provide a warning for the operator of an overload, and cam means rigidly mounted at the foot of said boom operative to vary the amount of movement of said movable member required to provide such warning for the operator in response to the angular position of the boom; said movable member comprising a stepped rod, a cylinder surrounding said stepped rod, said displaceable means supplying said cylinder with hydraulic fluid under pressure in response to changes in the pull on such derricking cable; and said displaceable means comprising a hydraulic piston-cylinder assembly interconnecting a sheave about which said boom derricking cable is trained and rigidly fastened to such superstructure, and hydraulic conduit means interconnecting said piston-cylinder assembly and the cylinder surrounding said stepped rod.

7. An indicator as set forth in claim 6 including a contact roller mounted on the end of said movable member for limited movement with respect thereto, spring means urging said roller out of electrical contact with said movable member, said spring means being compressed to make such electrical contact when said roller contact engages said cam.

8. In a crane of the type having a revolving superstructure, a boom pivotally mounted on such superstructure for movement in a vertical plane, and a boom derricking cable interconnecting said boom and superstructure for elevating the boom and load carried thereby, a safe load indicator comprising fluid displaceable means interconnecting said boom derricking cable and said superstructure, a movable member mounted on said boom operative to move in response to said fluid displaceable means and thus the load on said boom derricking cable to provide a warning for the operator of an overload, and cam means rigidly mounted at the foot of said boom operative to vary the amount of movement of said movable member required to provide such warning for the operator in response to the angular position of the boom, said movable member comprising one contact of a Bourbon tube pressure gauge, said gauge including a further contact operatively connected to said cam means to vary the distance between said contacts in response to the angular position of the boom.

9. A crane as set forth in claim 8 including a rack mounted on said boom for longitudinal sliding movement, a roller on the end of said rack resiliently continuously engaging said cam means, and a pinion operatively connected to said further contact in mesh with said rack to move said further contact in response to movement of said rack.

10. In a crane of the type having a revolving superstructure, a boom pivotally mounted on such superstructure for movement in a vertical plane, and a boom derricking cable interconnecting said boom and superstructure for elevating the boom and load carried thereby, a safe load indicator comprising fluid displaceable means interconnecting said boom derricking cable and said superstructure, a movable member mounted on said boom operative to move in response to said fluid displaceable means and thus the load on said boom derricking cable to provide a warning for the operator of an overload, cam means rigidly mounted at the foot of said boom operative to vary the amount of movement of said movable member required to provide such warning for the operator in response to the angular position of the boom, a second safe load indicator substantially identical in form to said first mentioned safe load indicator but set for over-the-side loadings, and switch means responsive to the rotative position of the superstructure to actuate one or the other of said safe load indicators.

11. A crane as set forth in claim 10 wherein said switch means comprises a roller-plunger microswitch, and a pair of switch actuators patterned for the extent of over-the-side and over-the-end operation, said actuators and switch being mounted for relative movement about the axis of the revolving superstructure.

References Cited by the Examiner

UNITED STATES PATENTS 3,035,712  5/1962  Nowack _____ 212—39

FOREIGN PATENTS 959,129  2/1957  Germany.
1,072,788  1/1960  Germany.
1,113,545  9/1961  Germany.

SAMUEL F. COLEMAN, *Primary Examiner.*

KARL J. ALBRECHT, WILLIAM B. LABORDE,
*Examiners.*